United States Patent
Ljung (10) Patent No.: US 9,510,266 B2
(45) Date of Patent: Nov. 29, 2016

(54) OPERATING A BASE STATION OF A RADIO ACCESS NETWORK

(71) Applicant: Sony Corporation, Tokyo (JP)

(72) Inventor: Rickard Ljung, Helsingborg (SE)

(73) Assignee: Sony Mobile Communications Inc., Tokyo (JP)

( * ) Notice: Subject to any disclaimer, the term of this patent is extended or adjusted under 35 U.S.C. 154(b) by 24 days.

(21) Appl. No.: 14/390,819

(22) PCT Filed: Oct. 11, 2013

(86) PCT No.: PCT/IB2013/002262
§ 371 (c)(1),
(2) Date: Oct. 6, 2014

(87) PCT Pub. No.: WO2015/052548
PCT Pub. Date: Apr. 16, 2015

(65) Prior Publication Data
US 2015/0382277 A1 Dec. 31, 2015

(51) Int. Cl.
*H04W 40/00* (2009.01)
*H04W 40/22* (2009.01)
*H04W 8/00* (2009.01)
*H04W 76/02* (2009.01)
*H04W 40/12* (2009.01)
*H04W 40/24* (2009.01)
*H04W 88/04* (2009.01)

(52) U.S. Cl.
CPC ............ *H04W 40/22* (2013.01); *H04W 8/005* (2013.01); *H04W 40/12* (2013.01); *H04W 40/246* (2013.01); *H04W 76/023* (2013.01); *H04W 88/04* (2013.01)

(58) Field of Classification Search
None
See application file for complete search history.

(56) References Cited

U.S. PATENT DOCUMENTS

| 2010/0167743 | A1 | 7/2010 | Palanki et al. | |
|---|---|---|---|---|
| 2013/0322388 | A1* | 12/2013 | Ahn | H04W 76/023 370/329 |
| 2014/0171062 | A1* | 6/2014 | Fallgren | H04W 40/22 455/422.1 |

FOREIGN PATENT DOCUMENTS

KR 20120074255 7/2012

OTHER PUBLICATIONS

"E-UTRAN based discovery of ProSe Relays", NEC, 3rd Generation Parternership Project (3GPP), [retrieved from internet, Jul. 19, 2013], <http://www.3gpp.org/ftp/tsg_sa/WG2_Arch/TSGS2_98_Valencia/Docs/>.

(Continued)

*Primary Examiner* — Erika Washington
(74) *Attorney, Agent, or Firm* — Renner, Otto, Boisselle & Sklar, LLP.

(57) ABSTRACT

The present invention relates to a method for operating a base station of a radio access network. According to the method, a first user equipment within a cell served by the base station is detected and a second user equipment within the cell served by the base station is detected. Furthermore, a relay request is sent to the first user equipment. The relay request instructs the first user equipment to relay a data communication between the base station and the second user equipment.

13 Claims, 3 Drawing Sheets

(56) References Cited

OTHER PUBLICATIONS

"3rd Generation Partnership Project; Technical Specification Group Services and System Aspects; Study on Architecture Enhancements to Support Proximity Services", Release 12, [retrieved online Oct. 7, 2013], <http://www.3gpp.org/ftp/tsg_sa/WG2_Arch/Latest_SA2_Specs/Latest_draft_S2_Specs/>.

International Search Report and Written Opinion from corresponding International Application No. PCT/IB2013/002262, mailed on Jul. 17, 2014.

* cited by examiner

OPERATING A BASE STATION OF A RADIO ACCESS NETWORK

FIELD OF THE INVENTION

The present invention relates to a method for operating a base station of a radio access network, especially for redirecting a data communication within a radio cell served by the base station. The present invention relates furthermore to a base station, a user equipment and a communication system implementing the method.

BACKGROUND OF THE INVENTION

In evolving wireless cellular telecommunication networks, for example 3GPP LTE, functionalities for both device-to-device communication as well as functionality for terminals to act as relays will be included. Currently, device-to-device communication is investigated within the concept of proximity-based services in 3GPP and relay functionality is analyzed both for mobile relays in general for extending an area served by a base station as well as part of emergency services within proximity-based services. However, increasing cell density and device-to-device communication within a cell may result in communication disturbance between the base station and terminal equipment within the cell served by the base station.

Therefore, there is a need for an improved operating of a base station and terminal equipments or user equipments in a radio access network.

SUMMARY OF THE INVENTION

According to the present invention, this object is achieved by a method for operating a base station of a radio access network as defined in claim 1, a method for operating a first user equipment as defined in claim 9, a method for operating a second user equipment as defined in claim 10, a base station for a radio access network as defined in claim 11, a first user equipment as defined in claim 13, a second user equipment as defined in claim 14, and a communication system as defined in claim 15. The dependent claims define preferred and advantageous embodiments of the invention.

According to an aspect of the present invention, a method for operating a base station of a radio access network is provided. According to the method, a first user equipment is detected within a cell served by the base station. Furthermore, a second user equipment within the cell served by the base station is detected. According to the method, a relay request is sent to the first user equipment. The relay request instructs the first user equipment to relay a data communication between the base station and the second user equipment. The data communication may comprise for example user data or signaling data in the form of data messages or signaling messages. In other words, the first user equipment and the second user equipment, which may both comprise terminal devices like for example mobile phones, are located within a single radio cell which is served by the base station. Thus, the base station may establish direct links to each user equipment, for example a first link for a direct data communication between the base station and the first user equipment and a second link for a data communication between the second user equipment and the base station. However, according to the present invention, a relay or redirect request is sent to the first user equipment and in response to receiving the relay request, the first user equipment is adapted to relay a data communication between the base station and the second user equipment, such that a direct communication via a separate link between the base station and the second user equipment is not used, but an indirect communication via the link between the base station and the first user equipment and a link representing device-to-device communication between the first user equipment and the second user equipment. In case, for example, the direct communication between the base station and the second user equipment is degraded or disturbed, for example due to crosstalk from an adjacent cell or due to environmental conditions for example in street canyons, an improved data communication may be realized by relaying the data communication via the first user equipment.

According to an embodiment, a first data transmission quality parameter for a data transmission between the base station and the first user equipment is determined and a second data transmission quality parameter for a data transmission between the base station and the second user equipment is determined. Depending on the first data transmission quality parameter or the second data transmission quality parameter or on both data transmission quality parameters the relay request is sent to the first user equipment. By determining or monitoring the data transmission quality for the data transmissions between the base station and the first and second user equipments, the base station may switch from direct data communication to the user equipments to a relayed data communication whenever the data transmission quality decreases and a required data communication performance may not be reached.

According to a further embodiment, a first indication indicating that the first user equipment has detected the second user equipment within a proximity for a device to-device communication between the first user equipment and the second user equipment is received from the first user equipment. Furthermore, from the second user equipment a second indication is received, which indicates that the second user equipment has detected the first equipment within a proximity for a device-to-device communication between the first user equipment and the second user equipment. The relay request is sent depending on receiving both indications, the first indication and the second indication. In other words, the first user equipment determines if a device-to-device communication to the second user equipment is possible and sends a corresponding indication to the base station. Similarly, the second user equipment determines if a device-to-device communication to the first user equipment is possible and sends a corresponding indication to the base station. When the base station receives the first indication from the first user equipment and the second indication from the second user equipment, the base station may send the relay request to the first user equipment. By receiving the first and second indications from the first and second user equipments it is assured that the device-to-device communication between the first and second user equipments can be established and thus, data communication between the base station and the second user equipment may be relayed via the first user equipment.

According to a further embodiment, a device-to-device data transmission quality parameter for a data transmission of the device-to-device communication between the first and second user equipment is received from the first user equipment or from the second user equipment. Depending on the device-to-device data transmission quality parameter the relay request is sent. By receiving the device-to-device data transmission quality parameter, the base station may decide if a data communication to the second user equipment may be enhanced by relaying the data communication via the first user equipment. Especially, considering the first and second data transmission quality parameters for the data transmission between the base station and the first and second user equipments as well as the device-to-device data transmission quality parameter may enable the base station to decide to either set up a direct data communication to the second user equipment or to relay the data communication to the second user equipment via a first user equipment for gaining an optimized data transmission, for example with respect to reliability or data transmission speed.

The first data transmission quality parameter, the second data transmission quality parameter and the device-to-device data transmission quality parameter may comprise for example a current data rate of the corresponding data transmission, a signal-to-noise ratio of the corresponding data transmission or a frequency band used for the corresponding data transmission. These parameters may be easily evaluated or may already be available such that the base station may optimize the performance of the radio access network with respect to the data transmission rate of each data transmission, the reliability of each data transmission or the total data transmission capacity within the cell served by the base station.

According to a further embodiment, an acknowledgement from the first user equipment is received. The acknowledgement acknowledges the relay request. Upon receiving the acknowledgement from the first user equipment, a redirect information formation is sent from the base station to the second user equipment. The redirect information instructs the second user equipment to transmit the data communication, which is to be transmitted to the base station, via the device-to-device communication to the first user equipment. By acknowledging the relay request, the first user equipment may enable a functionality for forwarding data communication from the base station to the second user equipment and for forwarding data communication from the second user equipment to the base station. On receiving the acknowledgement from the first user equipment, the base station may redirect information intended for the second user equipment to the first user equipment. To ensure that the return path from the second user equipment to the base station is running via the first user equipment, a redirect information may be provided to the second user equipment. Thus, by sending this redirect information to the second user equipment, a bidirectional data communication via the first user equipment as a relay can be reliably established.

According to a further embodiment, the base station comprises a scheduler for allocating radio resources to radio links between the base station and user equipments, which are arranged within the cell served by the base station, for example the first user equipment and the second user equipment. The scheduler may be configured or reconfigured to transmit the data communication, which is to be transmitted to the second user equipment, to the first user equipment. Thus, radio resources for a radio link between the base station and the second user equipment may be reused for other radio links, as the data communication to the second user equipment is performed via the radio link between the base station and the first user equipment.

According to another aspect of the present invention, the method for operating a first user equipment is provided. The first user equipment is configured to communicate with a radio access network. The first user equipment is arranged within a radio cell which is served by a base station of the radio access network. According to the method, the first user equipment detects a second user equipment within a proximity for a device-to-device communication between the first user equipment and the second user equipment. The second user equipment is also arranged within the cell in which the first user equipment is located. Upon detection of the second user equipment, the first user equipment sends an indication to the base station, which indicates that the first user equipment has detected the second user equipment for a device-to-device communication. The first user equipment receives a relay request from the base station to relay a data communication intended for the second user equipment. In other words, after detecting the second user equipment within a device-to-device communication range and indicating this to the base station, the first user equipment may receive a request to serve as a relay to establish a data communication between the base station and the second user equipment, wherein the data communication between the first user equipment and the second user equipment is a device-to-device communication. Upon receiving the relay request, the data communication between the base station and the second user equipment is relayed via the first user equipment. Thus, the first user equipment may be used in connection with a base station implementing the above-described method for operating a base station of a radio access network.

According to another aspect of the present invention, a method for operating a second user equipment is provided. The second user equipment is configured to communicate with a radio access network and is arranged within a radio cell which is served by a base station of the radio access network. According to the method, the second user equipment detects a first user equipment within a proximity for a device-to-device communication between the first user equipment and the second user equipment. The first user equipment is also arranged within the same cell served by the same base station. In other words, the first user equipment and the second user equipment are located within the same cell and are served by the same base station. Upon detecting the first user equipment and the possibility for a device-to-device communication between the first user equipment and the second user equipment, the second user equipment sends an indication to the base station which indicates that the second user equipment has detected the first user equipment for a device-to-device communication. The second user equipment may receive a redirect information from the base station and upon receiving the redirect information, the second user equipment transmits a data communication, which is to be transmitted to the base station, via the device-to-device communication to the first user equipment. Thus, the second user equipment may redirect the data communication intended for the base station to the first user equipment on request from the base station. Therefore, the second user equipment is adapted to be operated in the radio access network operated by the base station implementing the above-described method for operating a base station of a radio access network.

According to another aspect of the present invention, a base station for a radio access network is provided. The base station comprises a wireless radio interface for communicating wirelessly with a plurality of user equipment within a radio cell of the radio access network which is served by the base station. The base station comprises furthermore a processing device which is configured to detect a first user equipment within the cell served by the base station, and to detect a second user equipment within the cell served by the base station. Furthermore, the processing device is configured to send a relay request to the first user equipment. The relay request instructs the first user equipment to relay or forward a data communication between the base station and the second user equipment. Therefore, the base station is configured to perform the above-described method and comprises therefore the advantages described in connection with the method.

According to another aspect of the present invention, a first user equipment for a radio access network is provided. The first user equipment comprises a wireless radio interface for communicating wirelessly with a base station of the radio access network and a processing device configured to detect a second user equipment within a proximity for a device-to-device communication between the first user equipment and the second user equipment. The second user equipment is arranged within the radio cell served by the base station. The processing device may determine that the second user equipment is arranged within the same cell as the first user equipment by information exchanged between the first user equipment and the second user equipment via a device-to-device communication. Upon detecting the second user equipment, which is arranged within the same cell as the first user equipment, the first user equipment sends an indication to the base station which indicates that the first user equipment has detected the second user equipment. The processing unit of the first user equipment may receive a relay request from the base station, and upon receiving the relay request, the first user equipment relays data between the base station and the second user equipment. The first user equipment may be used in connection with the above-described base station and may therefore contribute to reach the above-described advantages.

According to another aspect of the present invention, a second user equipment for a radio access network is provided. The second user equipment comprises a wireless radio interface for communicating wirelessly with a base station of the radio access network. The second user equipment comprises furthermore a processing device which is configured to detect a first user equipment within a proximity for a device-to-device communication between the first user equipment and the second user equipment. The first user equipment is arranged within the same radio cell as the second user equipment, this means that the first user equipment is served by the same base station as the second user equipment. In other words, the first user equipment and the second user equipment are arranged within the same cell and are arranged such that a device-to-device communication between the first user equipment and the second user equipment may be established. Upon detecting the first user equipment, the second user equipment sends an indication to the base station. The indication indicates that the second user equipment has detected the first user equipment within a proximity for a device-to-device communication. The second user equipment may then receive a redirect information from the base station indicating to transmit a data communication, which is to be transmitted from the second user equipment to the base station, to the first user equipment via the device-to-device communication. Upon receiving the redirect information, the second user equipment transmits the data communication intended for the base station to the first user equipment instead of transmitting the data communication directly to the base station. Therefore, the second user equipment is adapted to be used in connection with the above-described base station and the first user equipment and comprises therefore the above-described advantages.

According to another aspect of the present invention, a communication system comprising at least one first user equipment as described above, at least one second user equipment as described above, and a base station as described above. The communication system allows to implement the above-described methods which may increase system data capacity by utilizing the device-to-device communication and the relay functionality. This may increase the dynamic data scheduling flexibility within the base station. Thus, the base station scheduler may ensure that a larger amount of data is scheduled over high capacity radio links, while low capacity links, for example deeply faded ones, can more often be avoided, thereby increasing the aggregated radio link bandwidth utilization and system capacity.

According to an embodiment, at least one of the first user equipment and the second user equipment comprises for example a mobile phone, a personal digital assistant, a mobile music player, a tablet computer, a laptop computer, a notebook computer or a navigation system. The devices realizing the above-described methods may provide more reliable data communications with a higher performance and bandwidth.

Although specific features described in the above summary and the following detailed description are described in connection with specific embodiments and aspects of the present invention, it should be understood that the features of the embodiments and aspects may be combined with each other unless specifically noted otherwise.

BRIEF DESCRIPTION OF THE DRAWINGS

The present invention will now be described in more detail with reference to the accompanying drawings.

DETAILED DESCRIPTION OF PREFERRED EMBODIMENTS

In the following, exemplary embodiments of the invention will be described in more detail. It is to be understood that the features of the various exemplary embodiments described herein may be combined with each other unless specifically noted otherwise. Same reference signs in the various drawings refer to similar or identical components. Any coupling between components or devices shown in the Figures may be a direct or indirect coupling unless specifically noted otherwise.

Figure 1:
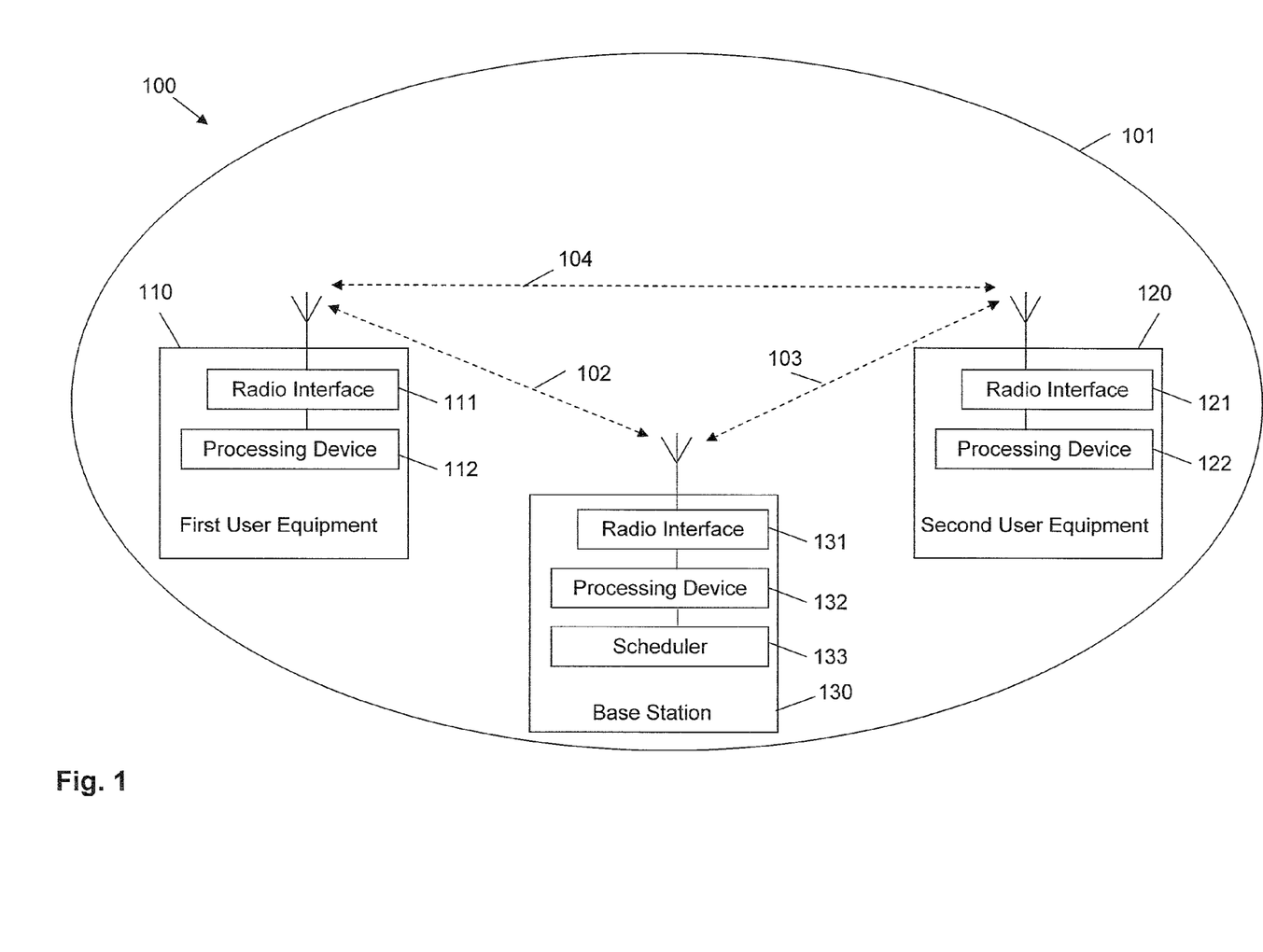
FIG. 1 shows a wireless communication system according to an embodiment of the present invention.

FIG. 1 shows a wireless communication system 100, for example a cellular based wireless telecommunication network. The communication system 100 may comprise a plurality of base stations. One of these base stations is shown as base station 130 in FIG. 1. For each base station a so called radio cell is assigned. A radio cell 101 shown in FIG. 1 is assigned to the base station 130. A user equipment, which is also called terminal equipment and which may comprise for example a mobile phone, a personal digital assistant, a tablet computer or a notebook computer, is arranged within the cell 101 and may register at the base station 130 and may then be served by the base station 130 with a data communication. The data communication may be used for voice transmissions or data transmissions, for example for downloading music or videos or for browsing the internet. In FIG. 1 a first user equipment 110 and a second user equipment 120 which are both arranged within the cell 101 and registered at the base station 130 are shown.

The first user equipment 110 comprises a wireless radio interface 111 and a processing device 112. The first user equipment 110 may comprise more components, for example a display, a microphone, a loudspeaker, a battery, and input means, but these components are not shown for clarity reasons. The second user equipment 120 comprises likewise a wireless radio interface 121 and a processing device 122. The base station 130 comprises a wireless radio interface 131, a processing device 132 and a scheduler 133.

In a cell-based communication system like the system 100 shown in FIG. 1, the user equipments 110, 120 register at the base station 130 and the radio links 102 and 103, respectively, are established for a data communication between the base station 130 and the first user equipment 110 and the second user equipment 120, respectively. When the first user equipment 110 wants to set up a data communication to a desired communication partner, for example or a voice communication or a data upload or a data download, the data is communicated via the radio link 102 between the first user equipment 110 and the base station 130, and the base station 130 establishes a further communication to the desired communication partner. The desired communication partner may comprise for example another user equipment within the same cell 101, for example the second user equipment 120, or may comprise another user equipment in another cell or a server in the internet or another user equipment in a wired communication network. The scheduler 133 is responsible for the traffic control defining at what time instant which radio resource should be allocated to each individual link between the base station 130 and the user equipment 110, 120. Specific parameters may be controlled which comprise for example a timing, output power, bandwidth, modulation, coding rate and so on.

To sum up, in traditional cell-based wireless communication systems, a user equipment 110, 120 is communicating via radio link 102, 103 with the base station 130 of the cell 101 in which it is arranged. In evolving telecommunication standards, for example within the third generation partnership project (3GPP) and the long term evolution (LTE) the functionality for a device-to-device communication between user equipment or terminal equipment is expected. In a device-to-device communication the first user equipment 110 is communicating with the second user equipment 120 via a direct radio link 104 as indicated in FIG. 1. This device-to-device communication via the radio link 104 may be used for improving performance of the communication system 100 within the cell 101 as will be shown in the following in connection with FIG. 2.

Figure 2:
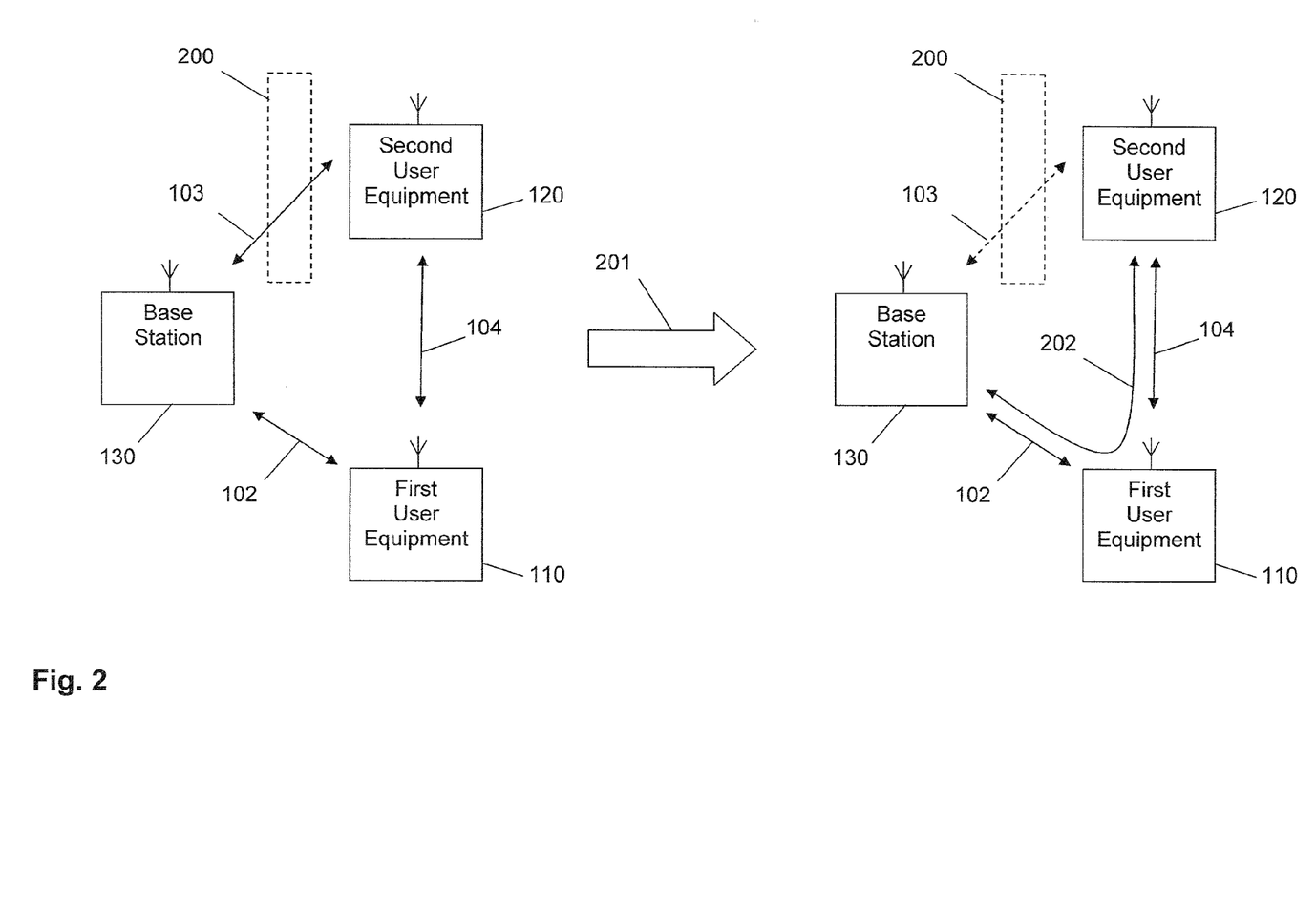
FIG. 2 shows the wireless communication system of FIG. 1, in which a first user equipment acts as a relay for a data communication between a base station and a second user equipment.

FIG. 2 shows on the left-hand side of arrow 201 the base station 130, the first user equipment 110 and the second user equipment 120 within the cell 101 as described in connection with FIG. 1 above. The first user equipment 110 is registered at the base station 130 and a first radio link 102 is established between the base station 130 and the first user equipment 110. The second user equipment 120 is also registered at the base station 130 and a corresponding radio link 103 is established between the base station 130 and the second user equipment 120. However, a disturbance or obstruction 200 disturbs or influences the radio link 103. The radio link 103 may therefore work at lower performance, for example at a lower data transmission rate due to higher noise, or the radio link 103 may have a lower reliability due to temporary drop outs. However, a radio link 104 may be established between the first user equipment 110 and the second user equipment 120 via a direct device-to-device communication. Although the second user equipment 120 is within the range or network coverage of the base station 130, data communication between the base station 130 and the second user equipment 120 may be redirected or rerouted via the first user equipment 110 as indicated on the right-hand side of arrow 201 in FIG. 2. As indicated on the right-hand side in FIG. 2, the first user equipment 110 is acting as a relay and the data communication 202 between the base station 130 and the second user equipment 120 is established via the relay function of the first user equipment 110. However, the radio link 103 with decreased performance may still be used for example for signaling between the base station 130 and the second user equipment 120.

Figure 3:
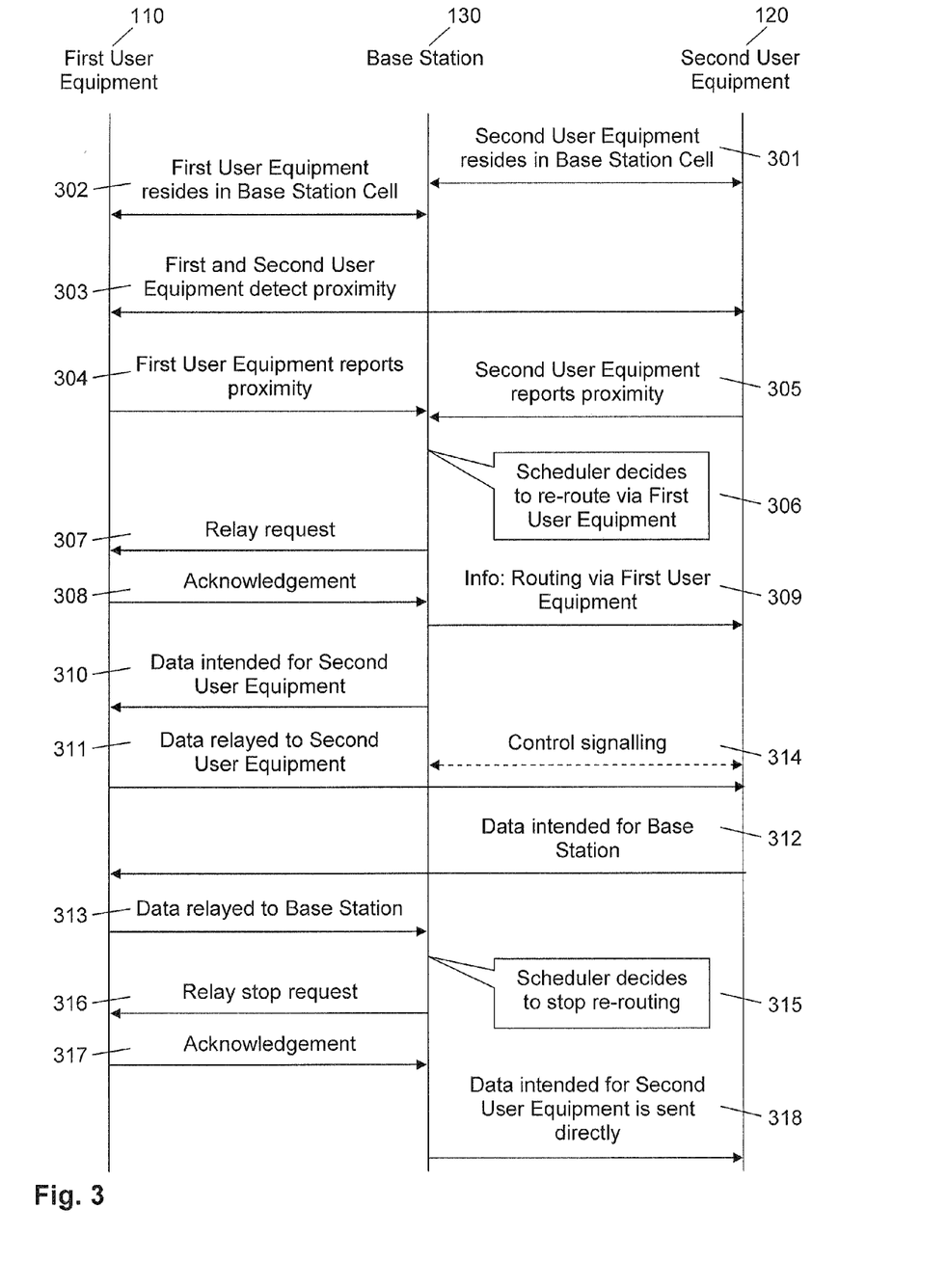
FIG. 3 shows a flowchart comprising method steps according to an embodiment of the present invention.

A method for establishing the rerouted or redirected data communication 202 shown in FIG. 2 will be described in more detail in connection with FIG. 3. In other words, in FIG. 3 a method is described for transitioning the communication structure shown on the left-hand side in FIG. 2 to the communication structure shown on the right-hand side in FIG. 2.

In step 301 the second user equipment 120 is arranged in cell 101 which is served by the base station 130 and therefore the second user equipment 120 registers at the base station 130. In step 302 the first user equipment 110, which is also located within the cell 101, registers at the base station 130. In step 303 the first user equipment 110 and the second user equipment 120 detect proximity to each other via a device-to-device communication. It should be noted that the steps 301 to 303 may occur in any order and the order shown in FIG. 3 is only exemplarily. This proximity and the possibility of a device-to-device communication is communicated in step 304 from the first user equipment 110 to the base station 130, and likewise in step 305 from the second user equipment 120 to the base station 130. This information is now used by the scheduler 133 of the base station 130 and the scheduler 133 may decide to initiate the rerouting or redirecting as shown on the right-hand side in FIG. 2. The decision may be based on a data transmission quality of the radio links 102, 103 and may be based also on a quality of the radio link 104 of the device-to-device communication between the first and second user equipment 110, 120. In step 306 the scheduler may decide to reroute a data communication which is intended for the second user equipment 120 via the first user equipment 110 thus using the radio link 102 between the base station 130 and the first user equipment 110 and the radio link 104 of the device-to-device communication between the first and second user equipment 110, 120. To accomplish this rerouting or redirecting, a relay request is sent from the base station 130 to the first user equipment 110 in step 307. The relay request instructs the first user equipment 110 to relay a data communication which is intended for communicating data between the base station 130 and the second user equipment 120. In step 308 the first user equipment 110 acknowledges the relay request to the base station 130. Then, the base station 130 informs in step 309 the second user equipment via the radio link 103 that a data communication to the second user equipment 120 is rerouted via the first user equipment 110 using the device-to-device communication of radio link 104. Steps 310-313 relate to the rerouted or redirected data communication or data traffic which is relayed by the first user equipment 110. Therefore, the steps 310-313 may occur a plurality of times for transmitting a plurality of data communication. In step 310 data intended for the second user equipment 120 is sent directly from the base station 130 via the radio link 102 to the first user equipment 110. In step 311 the first user equipment 110 relays or forwards the received data via the radio link 104 as a device-to-device communication directly to the second user equipment 120. Vice versa, in step 312 the second user equipment 120 may send data which is intended for the base station 130 directly via the radio link 104 to the first user equipment 110 and the first user equipment 110 relays the received data in step 313 to the base station 130. As described above, steps 310-313 may be repeated in any order to accomplish the required data communication. Although data communication between the second user equipment 120 and the base station 130 is relayed via the first user equipment 110, at least a control signaling may be exchanged directly between the second user equipment 120 and the base station 130 via the radio link 103 as shown by step 314. In step 315 the scheduler 133 of the base station 130 may decide to stop the rerouting, for example when the transmission quality of the radio link 103 has improved as determined by the control signaling in step 314. To stop the rerouting, the base station 130 may send a corresponding request to stop relaying to the first user equipment 110 in step 316. The first user equipment 110 acknowledges the request to stop the relaying in step 317, and data which is to be sent to the second user equipment 120 is directly sent from the base station 130 via the radio link 103 to the second user equipment 120 in step 318.

The above-described traffic scheduling may increase system data capacity by taking benefit of the device-to-device communication as well as a functionality for a terminal device or user equipment to act as a relay. The above-described method may be implemented by adding new signaling procedures between the base station 130 and the user equipment 110, 120 as described in connection with FIG. 3. By utilizing a device-to-device communication and the relay possibility the dynamic data scheduling flexibility within the base station 130 may be increased. The base station scheduler 133 may ensure that a larger amount of data is scheduled over high capacity radio links while low capacity links, which may be deeply faded, may more often be avoided, thereby increasing the aggregated radio link bandwidth utilization and system capacity.

Although, as can be seen from FIG. 2, the resulting traffic route 202 will in total require two radio links 102 and 104 and therefore may not seem to be the most efficient scheduling strategy, there may be other aspects impacting scheduling decisions. One obvious reason may be the frequency allocation strategies causing limitations in the resources in one frequency band while others are still available. Specifically, this may occur if device-to-device traffic has been allocated to a separate frequency band. Additionally, the radio link 103 from the base station 130 to the second user equipment 120 may have very bad radio properties, which would therefore consume significant amounts of radio resources, for example transmission power, in order to handle a data communication request. If the first user equipment 110 at the same time would have significantly better radio coverage, for example due to different antenna configurations or local differences, a rerouting of the data communication over the first user equipment 110 may be beneficial.

With respect to the above-described rerouting and signaling a new control information for the scheduler 133 may be included in the standard specifications, for example for LTE. As described above, the method requires a possibility for the base station 130 to request the first user equipment 110 to relay a data communication towards the second user equipment 120, and for the first user equipment to indicate that it is capable of handling relay requests. The scheduling information from the base station may be handled within so-called physical downlink control channel signals (PDCCH) specified in 3GPP TS 36.211 with signaling procedures in 36.213. The relay request would be suitable to be included for example as a radio resource control (RRC) message into TS 36.331 and the capabilities of the user equipment may be defined in TS 36.306 and TS 36.331.

It may be noted that the above-described method for redirecting data communication or a data traffic using device-to-device communication may be utilized in other cases where a relay functionality is utilized within the network. For example, a user equipment which is being offered service directly via a base station but is losing its ordinary network coverage may continue its communication service by the base station utilizing the traffic scheduling signaling via a relay functionality of another user equipment. Furthermore, a user equipment which is being offered service via a relay user equipment due to being out of ordinary direct coverage to a base station could upon reaching ordinary direct network coverage via a base station continue to get scheduled traffic via the relaying user equipment by utilizing the above-described signaling.

The invention claimed is:

1. A method for operating a base station of a radio access network, the method comprising:
    detecting a first user equipment within a cell served by the base station,
    detecting a second user equipment within the cell served by the base station,
    receiving from the first user equipment a first indication indicating that the first user equipment has detected the second user equipment within a predefined proximity,
    receiving from the second user equipment a second indication indicating that the second user equipment has detected the first user equipment within a predefined proximity, and
    sending a relay request to the first user equipment depending on both the first indication and the second indication, the relay request instructing the first user equipment to relay a data communication between the base station and the second user equipment.

2. The method according to claim 1, further comprising:
    determining a first data transmission quality parameter for a data transmission between the base station and the first user equipment,
    determining a second data transmission quality parameter for a data transmission between the base station and the second user equipment, and
    sending the relay request depending on at least one of the first and second data transmission quality parameters.

3. The method according to claim 1, further comprising:
    receiving from the first user equipment the first indication indicating that the first user equipment has detected the second user equipment within a proximity for a device-to-device communication between the first user equipment and the second user equipment,
    receiving from the second user equipment the second indication indicating that the second user equipment has detected the first user equipment within a proximity for a device-to-device communication between the first user equipment and the second user equipment.

4. The method according to claim 3, further comprising:
    receiving from at least one of the first user equipment and the second user equipment a device-to-device data transmission quality parameter for a data transmission of the device-to-device communication between the first user equipment and the second user equipment, and sending the relay request depending on the device-to-device data transmission quality parameter.

5. The method according to claim 4, wherein at least one of the first, the second and the device-to-device data transmission quality parameters comprises:

a current data rate of the corresponding data transmission, a signal-to-noise ratio of the corresponding data transmission, and/or a frequency band used for the corresponding data transmission.

6. The method according to claim 3, further comprising:

receiving an acknowledgement from the first user equipment acknowledging the relay request, and upon receiving the acknowledgement from the first user equipment, sending a redirect information to the second user equipment, the redirect information instructing the second user equipment to transmit the data communication, which is to be transmitted to the base station, via the device-to-device communication to the first user equipment.

7. The method according to claim 1, further comprising:

transmitting the data communication, which is to be transmitted to the second user equipment, to the first user equipment.

8. The method according to claim 7, wherein the base station comprises a scheduler for allocating radio resources to radio links between the base station and user equipment within the cell served by the base station, the method further comprising:

configuring the scheduler for transmitting the data communication, which is to be transmitted to the second user equipment, to the first user equipment.

9. A method for operating a second user equipment, the second user equipment being configured to communicate with a radio access network and being arranged within a cell served by a base station of the radio access network, the method comprising:

detecting a first user equipment within a proximity for a device-to-device communication between the first user equipment and the second user equipment, wherein the first user equipment is arranged within the cell served by the base station, upon detecting the first user equipment, sending to the base station an indication indicating that the second user equipment has detected the first user equipment, receiving a redirect information from the base station, and upon receiving the redirect information, transmitting a data communication, which is to be transmitted to the base station, via the device-to-device communication to the first user equipment.

10. A base station for a radio access network, comprising:

a wireless radio interface for communicating wirelessly with a plurality of user equipment within a cell served by the base station, and a processing device, configured to detect a first user equipment within the cell served by the base station, to detect a second user equipment within the cell served by the base station, to receive from the first user equipment a first indication indicating that the first user equipment has detected the second user equipment within a predefined proximity, to receive from the second user equipment a second indication indicating that the second user equipment has detected the first user equipment within a predefined proximity, and to send a relay request to the first user equipment depending on both the first indication and the second indication, the relay request instructing the first user equipment to relay a data communication between the base station and the second user equipment.

11. A communication system, comprising at least one first user equipment, at least one second user equipment, and a base station according to claim 10.

12. The communication system according to claim 11, wherein at least one of the first user equipment and the second user equipment comprises at least one device of a group consisting of a mobile phone, a personal digital assistant, a mobile music player, a tablet computer, a laptop computer, a notebook computer, and a navigation system.

13. A second user equipment for a radio access network, comprising:

a wireless radio interface for communicating wirelessly with a base station of the radio access network, and a processing device, configured to detect a first user equipment within a proximity for a device-to-device communication between the first user equipment and the second user equipment, wherein the first user equipment is arranged within a cell served by the base station, upon detecting the first user equipment, to send to the base station an indication indicating that the second user equipment has detected the first user equipment, to receive a redirect information from the base station, and upon receiving the redirect information, to transmit a data communication, which is to be transmitted to the base station, via the device-to-device communication to the first user equipment.

* * * * *